US 7,725,537 B2

(12) United States Patent
Burckart et al.

(10) Patent No.: US 7,725,537 B2
(45) Date of Patent: May 25, 2010

(54) METHOD OF AND SYSTEM FOR RETRACTING INSTANT MESSAGES

(75) Inventors: Erik J. Burckart, Raleigh, NC (US); Andrew Ivory, Wake Forest, NC (US); Aaron K. Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 11/769,368

(22) Filed: Jun. 27, 2007

(65) Prior Publication Data

US 2009/0006561 A1    Jan. 1, 2009

(51) Int. Cl.
*G06F 15/16* (2006.01)
(52) U.S. Cl. ...................................... 709/204; 709/206
(58) Field of Classification Search ................. 709/204, 709/206
See application file for complete search history.

(56) References Cited

U.S. PATENT DOCUMENTS

2004/0205134 A1*  10/2004  Digate et al. ................. 709/206
2004/0254998 A1*  12/2004  Horvitz ....................... 709/206
2005/0267942 A1*  12/2005  Quinn et al. ................. 709/206
2006/0161853 A1*   7/2006  Chen et al. ................... 715/758

* cited by examiner

*Primary Examiner*—Quang N Nguyen
*Assistant Examiner*—Andrew Woo
(74) *Attorney, Agent, or Firm*—Dillon & Yudell LLP

(57) ABSTRACT

A method of and system for enabling retraction of instant messages detects a command to send an instant message from an instant message window. The system determines if the command is the first command sent from the instant message window after the window has received focus. If so, the system delays the execution of the command for a delay time according to a retraction policy, and provides a retraction control for canceling said command. The system cancels the command in response to actuation of the retraction control. The system may cancel the instant message in response to actuation of the retraction control. The system sends the instant message in response to expiration of the delay time without an actuation of the retraction control. The system may provide a control for sending the instant message before expiration of the delay time. The retraction policy may provide different delay times for different categories of recipients. The delay time may be zero for certain categories of recipients. The retraction policy may be configurable by a user.

5 Claims, 4 Drawing Sheets

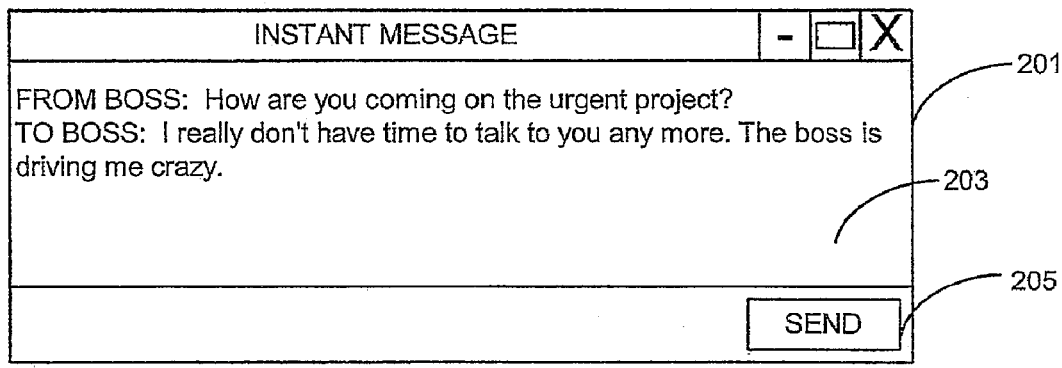
FIG. 2
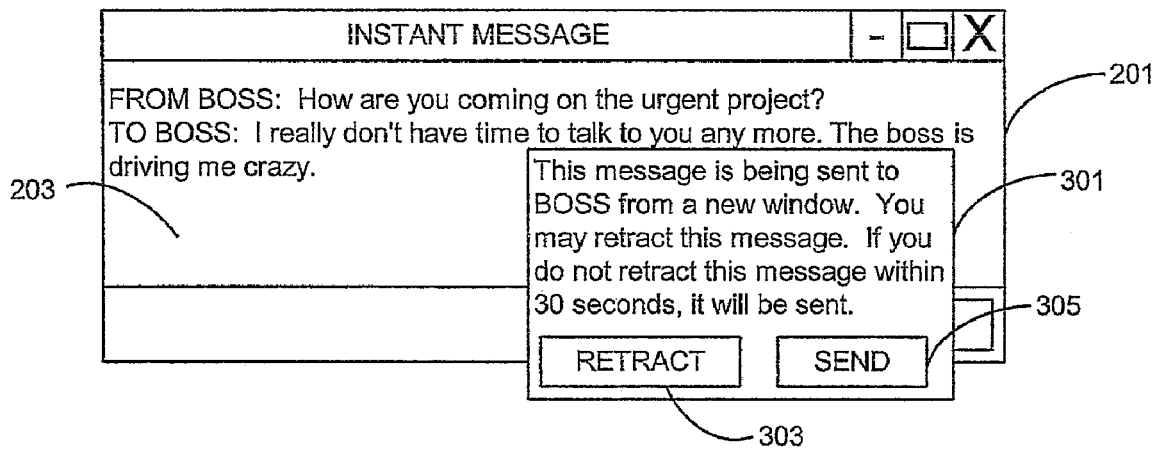
FIG. 3
| CATEGORY | DELAY TIME (SEC.) |
|---|---|
| BUDDY | 0 |
| MANAGEMENT | 60 |
| TEAM MEMBER | 10 |
| ANYONE ELSE | 15 |
FIG. 4

METHOD OF AND SYSTEM FOR RETRACTING INSTANT MESSAGES

BACKGROUND OF THE INVENTION

1. Technical Field

The present invention relates generally to the field instant messaging, and more particularly to a method of and system for delaying the sending of, and/or retracting, instant messages according to a configurable policy.

2. Description of the Related Art

Instant messaging has become very popular and useful both in the workplace and in individual social personal computing. During instant messaging, however, messages are often erroneously sent to the wrong party. For example, a new window can pop in front of the current chat window. The user, not realizing that a new window is the focus window, may respond to a previous message from another party and send a message to the new party. Similarly, the sender could maximize the wrong window and type and send a message to the wrong party. Currently, instant messages cannot be retracted once they are sent. The inability to retract instant messages often leads to confusion and/or embarrassment.

SUMMARY OF THE INVENTION

The present invention provides a method of and system for enabling retraction of instant messages. An embodiment of a system according to the present invention detects a command to send an instant message from an instant message window. The system determines if the command is the first command sent from a newly focused instant message window. If so, the system delays the execution of the command for a delay time according to a retraction policy, and provides a retraction control for canceling said command. The system cancels the command in response to actuation of the retraction control. The system may cancel the instant message in response to actuation of the retraction control. The system sends the instant message in response to expiration of the delay time without an actuation of the retraction control. The system may provide a control for sending the instant message before expiration of the delay time. The retraction policy may provide different delay times for different categories of recipients. The delay time may be zero for certain categories of recipients. The retraction policy may be configurable by a user.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates an instant message window;

FIG. 3 illustrates the instant message window of FIG. 1 with an embodiment of a retraction dialog according to the present invention;

FIG. 4 illustrates an embodiment of an instant message delay policy table according to the present invention;

DETAILED DESCRIPTION OF THE PREFERRED EMBODIMENT

Figure 1:
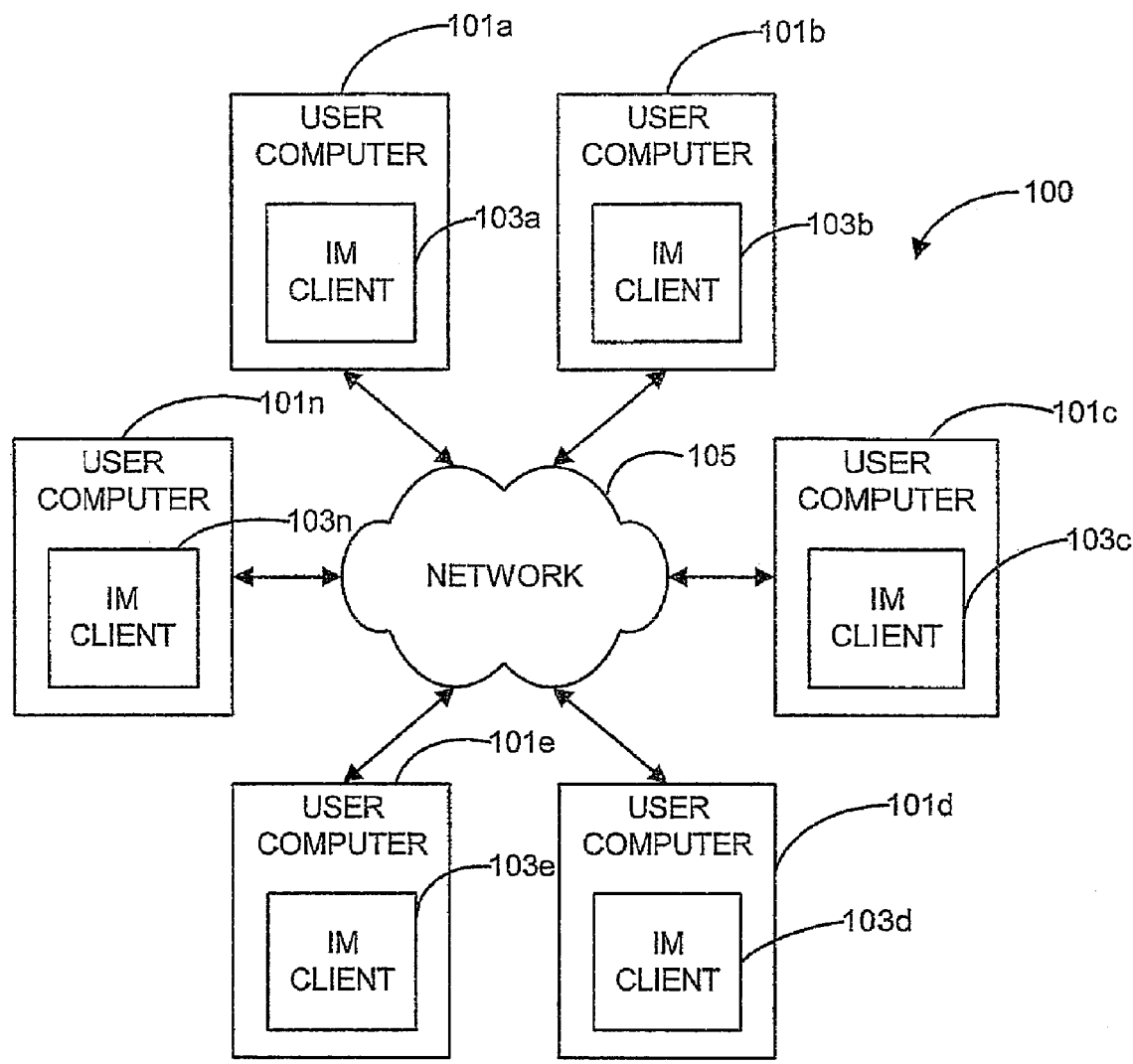
FIG. 1 is a block diagram of an embodiment of a system according to the present invention.

Referring now to the drawings, and first FIG. 1, a system according to the present invention is designated generally by the numeral 100. System 100 includes a plurality of user computers 101. A user computer 101 may be a personal computer, a notebook computer, a workstation, a personal digital assistant, or any other computing device. Each user computer 101 includes an instant messaging (IM) client 103. IM client 103 may be any of several well-known instant messaging clients. Each user computer 101 is coupled to a network, indicated generally at 105. Network 105 may be any type of network, such as a local area network, a wide area network, the Internet, etc.

FIG. 2 illustrates an instant messaging window 201. A separate instant messaging window is associated with each instant messaging session instance on a user's computer. Whenever a user's computer receives an instant message, that instant message is displayed in a window 201, and that window becomes the focus window on the user's desktop. A user may have multiple instant message sessions active at the same time. Instant messaging window 201 includes a text field 203 that displays text messages from a party be referred to herein as the recipient and into which a user can enter text to be sent to the recipient as an instant message. Instant message window to one includes a send button 205. Normally, actuation of send button 205 causes the latest text entered by the user to be sent immediately to the recipient as an instant message. However, according to the present invention, the user may not have intended to send the latest text entered to a particular recipient. According to the present invention, the user is given an opportunity to retract the instant message.

FIG. 3 illustrates instant message window 201 with a retract dialog 301 according to an embodiment of the present invention overlaid thereon. As will be described in detail hereinafter, embodiments of the present invention display or pop up a retract dialog according to a retraction policy the first time an instant message is sent from instant message window 201. The retraction policy may be configurable by the user. In the embodiment of retraction dialog 301, the user is advised that a message is being sent to a particular with recipient in a new window. The retraction dialog 301 advises the user that he or she may retract the message, but if he or she does not retract the message, it will be sent automatically after the expiration of a specified time. Retract dialog 301 includes a retract button 303. Actuation of retract button 303 cancels the send command. Actuation of retract button 303 may also cause the text entered by the user into text field 203 to be deleted. Retract dialog 301 may also include a send button 305. Actuation of send button 305 overrides the delay in sending a instant message and causes the instant message to be sent immediately.

FIG. 4 illustrates an embodiment of a retraction policy table 401 according to the present invention. Retraction policy table 401 includes a category column 403 and a delay time column 405. Category column 403 includes various categories of recipients. Delay time column 405 includes the delay times in seconds associated with each category in category column 403. In embodiments of the present invention, the delay times in the late time column 405 may be configurable by the user. The delay time may be zero whereby instant messages to recipients of a particular category may be sent immediately.

Figure 5:
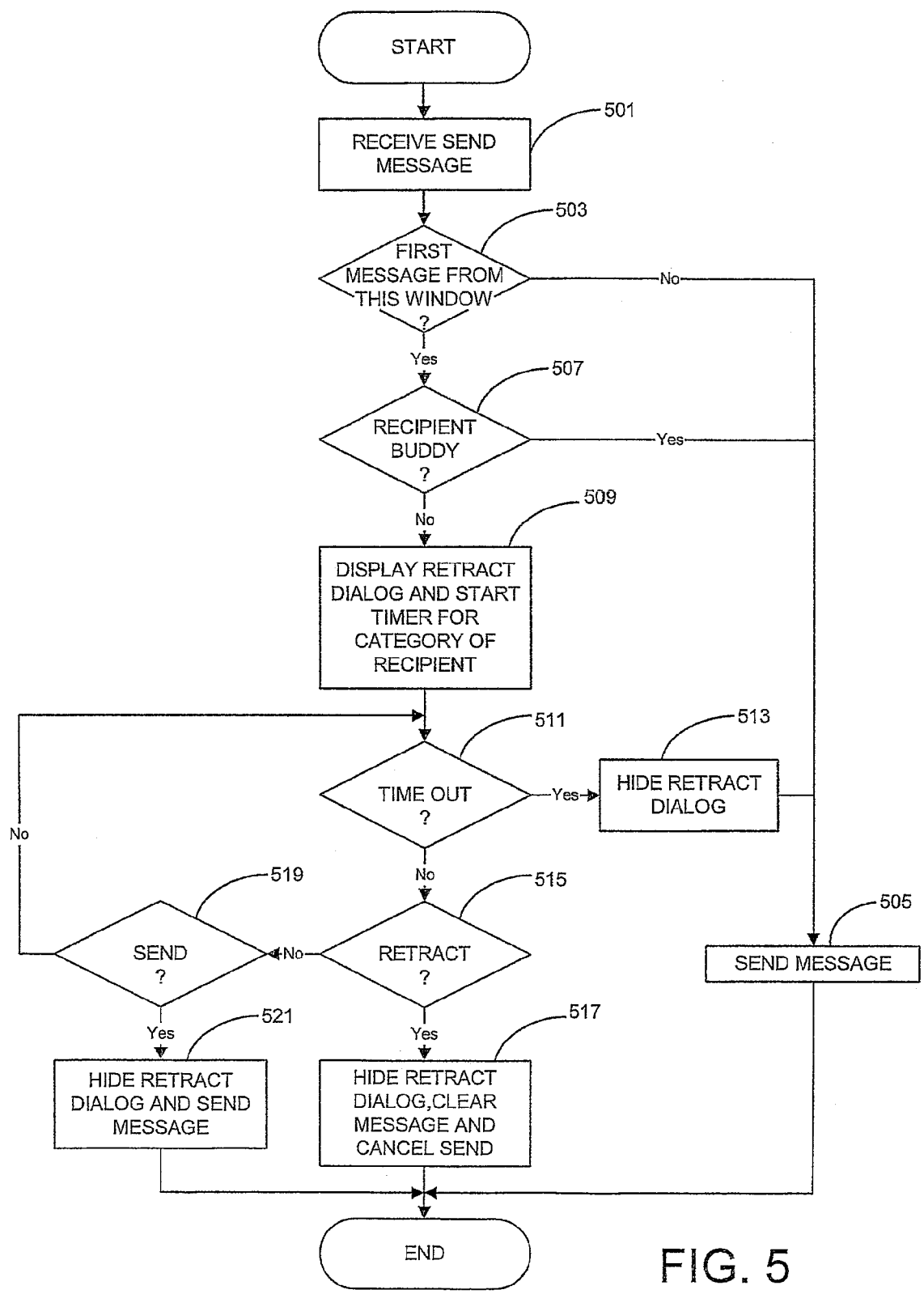
FIG. 5 is a flow chart of an embodiment of delay and retraction processing according to the present invention; and, FIG. 6 is a block diagram of an information handling system adapted to embody systems and methods according to the present invention.

FIG. 5 is a flow chart of instant message session processing according to an embodiment of the present invention. The system receives a send message, as indicated at block 501. The system determines, at decision block 503, if the present messages the first message sent from this window after this window has received focus, or become the active window on the user's desktop. A window receives focus when it is first opened, for example when a new instant messaging session instance is launched in response to receipt of an instant message, or when an old window is surfaced on the user's desktop. In either event, a window may receive focus without the user's knowledge or awareness. If the present message is not the first message sent from the window after it has received focus, the system sends the message at block 505 and processing ends. If the present messages not the first message sent in this window, then the system determines, at decision block 507, if the recipient of the message is a buddy. It will be recalled from FIG. 4 that the buddy category has a delay time of zero. Thus, if the recipient is a buddy, the system sends the message, at block 505, and processing ends. If, as determined at decision block 507, the recipient is not a buddy, the system displays a retract dialog of the type illustrated in FIG. 3, and starts a timer for the category of the recipient, all as indicated at block 509. If, as determined at decision block 511, the timer times out without the user having actuated the retract button or the send button, the system hides the retract dialog at block 513 and sends the message at block 505. If, as determined at decision block 515, the user actuates the retract button, the system hides the retract dialog, clears the message and cancels the send command, as indicated at block 517. If, as determined at decision block 519, the user actuates the send button of the retract dialog, the system hides the retract dialog and sends the message, as indicated at block 521.

Figure 6:
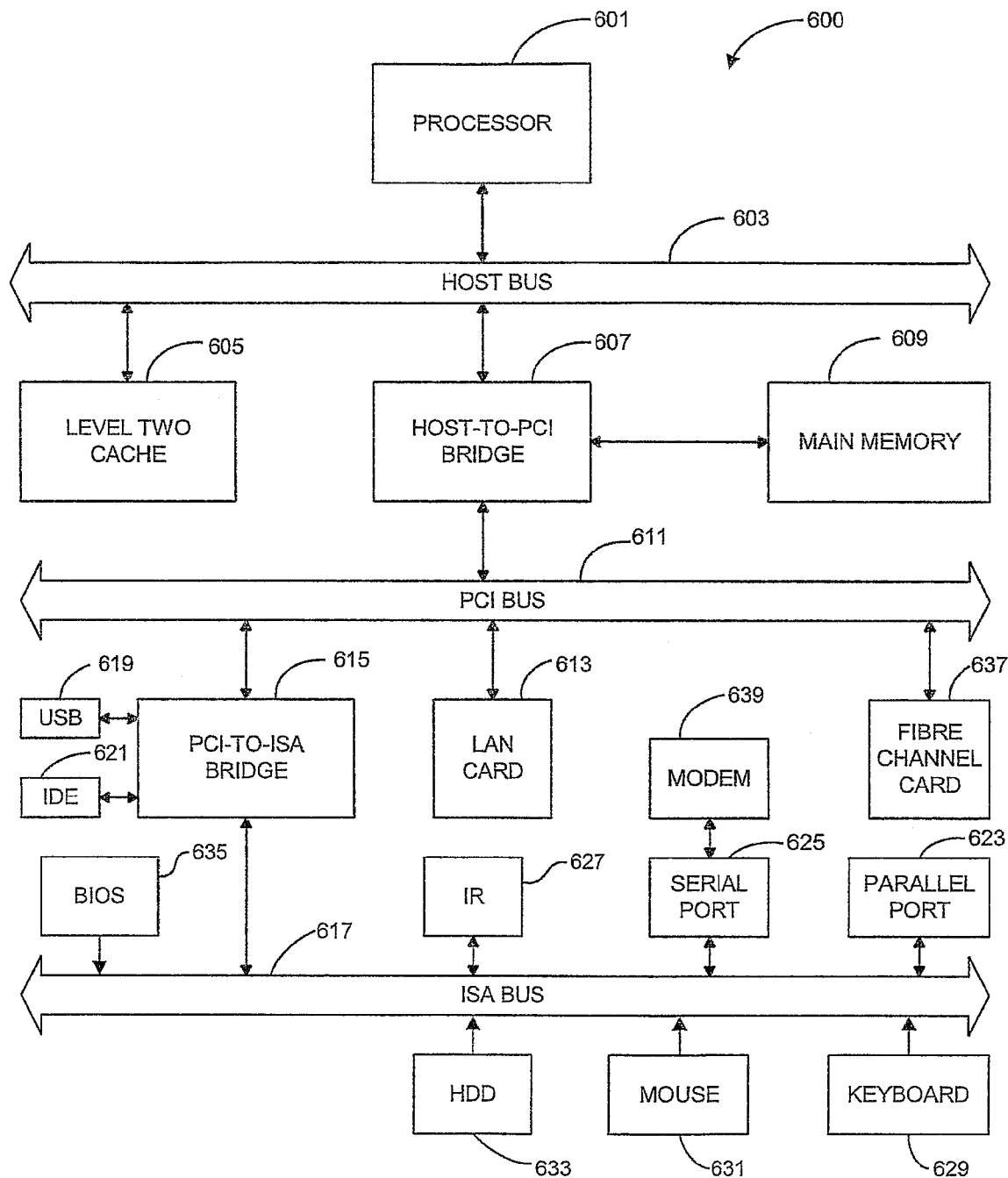

Referring now to FIG. 6, there is illustrated a block diagram of a generic information handling system 600 capable of performing the server and client operations described herein. Computer system 600 includes processor 601 which is coupled to host bus 603. Processor 601 preferably includes an onboard cache memory. A level two (L2) cache memory 605 is also coupled to host bus 603. A Host-to-PCI bridge 607 is coupled to host bus 603. Host-to-PCI bridge 607, which is coupled to main memory 609, includes its own cache memory and main memory control functions. Host-to-PCI bridge 607 provides bus control to handle transfers among a PCI bus 611, processor 601, L2 cache 605, main memory 609, and host bus 603. PCI bus 611 provides an interface for a variety of devices including, for example, a local area network (LAN) card 613, a PCI-to-ISA bridge 615, which provides bus control to handle transfers between PCI bus 611 and an ISA bus 617, a universal serial bus (USB) 619, and an IDE device 621. PCI-to-ISA bridge 615 also includes onboard power management functionality. PCI-to-ISA bridge 615 can include other functional elements not shown, such as a real-time clock (RTC), DMA control, interrupt support, and system management bus support.

Peripheral devices and input/output (I/O) devices can be attached to various interfaces or ports coupled to ISA bus 617. Such interfaces or ports may include a parallel port 623, a serial port 625, an infrared (IR) interface 627, a keyboard interface 629, a mouse interface 631, and a hard disk drive (HDD) 633.

A BIOS 635 is coupled to ISA bus 617. BIOS 635 incorporates the necessary processor executable code for a variety of low-level system functions and system boot functions. BIOS 635 can be stored in any computer readable medium, including magnetic storage media, optical storage media, flash memory, random access memory, read only memory, and communications media conveying signals encoding the instructions (e.g., signals from a network). In order to couple computer system 600 to another computer system to copy files or send and receive messages over a network, LAN card 613 may be coupled to PCI bus 611. Similarly, a Fibre Channel card may be coupled to PCI bus 613. Additionally, a modem 639 may be coupled to ISA bus 617 through serial port 625 to support dial-up connections.

While the computer system described in FIG. 6 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of enabling retraction of instant messages, which method comprises:
    detecting a command to send an instant message from an instant message window;
    determining if said command is a first command received/entered at said instant message window to send an instant message after said instant message window has received focus; and
    if said command is determined to be the first command to send an instant message after said instant message window has received focus:
    automatically delaying completion of said command to send the instant message for a preset delay time after said command is received;
    providing a user selectable retraction control for canceling said command during the preset delay time;
    sending said instant message only after expiration of said delay time without detecting/receiving an actuation of said retraction control;
    providing a user selectable control for sending said instant message before expiration of said preset delay time;

sending said instant message in response to actuation of said control for sending said instant message before expiration of said preset delay time;

wherein said preset delay time is set according to a retraction policy;

wherein said retraction policy is configurable by a user to prevent the instant message from being sent after receipt of the command to send the instant message until the expiration of the preset delay time, which value ranges from zero delay to a larger value delay;

wherein said retraction policy provides different delay times for different categories of recipients; and wherein said preset delay time is zero for a first category of recipients and a different value for a second category of recipients, such that said command and said instant message are transmitted without delay for only the first category of recipients, while said instant message is transmitted to the second category of recipients only after expiration of the different value of preset delay time that is not zero.

2. The method as claimed in claim 1, further comprising:
canceling said command in response to actuation of said retraction control.

3. The method as claimed in claim 1, further comprising:
canceling instant message in response to actuation of said retraction control.

4. An instant message system, which comprises:
a Central Processing Unit (CPU);
a memory unit coupled to the CPU;
means for detecting a command to send an instant message from an instant message window;
means for determining if said command is a first command sent from said instant message window to send an instant message;
means for delaying completion of said command to send the instant message for a preset delay time if said command is determined to be the first command send from said instant message window after said instant message window has received focus;
means for providing a retraction control for canceling said command if said command is determined to be the first command to send an instant message after said instant message window receives focus;
means for canceling said command and not sending said instant message in response to actuation of said retraction control during the preset delay time;
means for sending said instant message in response to expiration of said preset delay time without an actuation of said retraction control;
means for providing a control for sending said instant message before expiration of said time if said command is determined to be the first command send from said instant message window; and
means for sending said instant message in response to actuation of said control for sending said instant message before expiration of said delay time;

wherein said delay time is set according to a retraction policy;

wherein said retraction policy is configurable by a user to prevent the instant message from being sent after receipt of the command to send the instant message until the expiration of the preset delay time, which value ranges from zero delay to a larger value delay;

wherein said retraction policy provides different delay times for different categories of recipients; and wherein said preset delay time is zero for a first category of recipients and a different value for a second category of recipients, such that said command and said instant message are transmitted without delay for only the first category of recipients, while said instant message is transmitted to the second category of recipients only after expiration of the different value of preset delay time that is not zero.

5. An article of manufacture for implementing a method of retracting an instant message, said article of manufacture comprising:
a computer readable storage medium having computer readable code thereon, said compute readable code comprising:
instructions for detecting a command to send an instant message from an instant message window;
instructions for determining if said command is a first command sent from received at said instant message window to send an instant message after said instant message window has received focus;
instructions for delaying acting on said command to send the instant message for a preset delay time if said command is determined to be the first command received/entered at said instant message window;
instructions for providing a retraction control if said command is determined to be the first command received/entered at said instant message window;
instructions for canceling one or both of said command and said instant message in response to actuation of said retraction control during the preset delay time;
instructions for sending said instant message in response to expiration of said preset delay time without an actuation of said retraction control;
instructions for providing a control for sending said instant message before expiration of said time if said command is determined to be the first command send from said instant message window; and
instructions for sending said instant message in response to actuation of said control for sending said instant message before expiration of said delay time;

wherein said delay time is set according to a retraction policy;

wherein said retraction policy is configurable by a user to prevent the instant message from being sent after receipt of the command to send the instant message until the expiration of the preset delay time, which value ranges from zero delay to a larger value delay;

wherein said retraction policy provides different delay times for different categories of recipients; and wherein said preset delay time is zero for a first category of recipients and a different value for a second category of recipients, such that said command and said instant message are transmitted without delay for only the first category of recipients, while said instant message is transmitted to the second category of recipients only after expiration of the different value of preset delay time that is not zero.

* * * * *